May 19, 1959  G. GORHAM  2,886,971
PRESSURE GAGE VALVE FOR RESPIRATORS
Filed Dec. 31, 1954
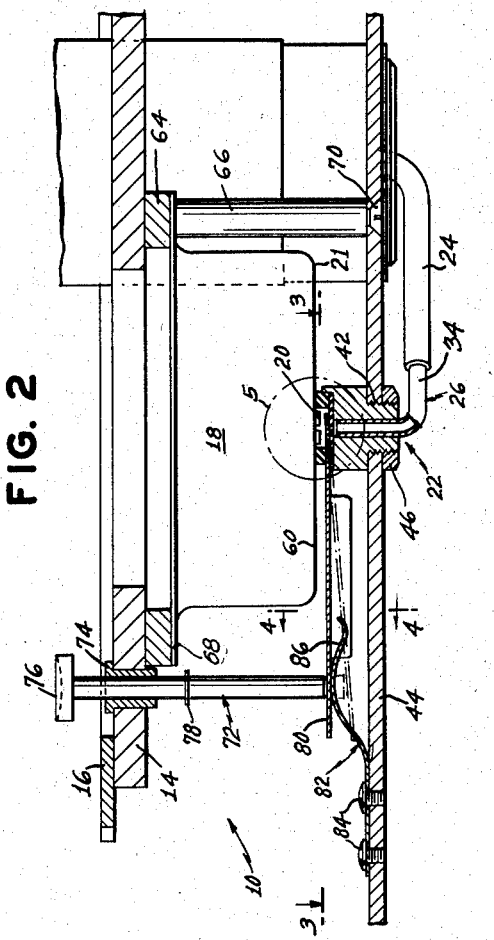
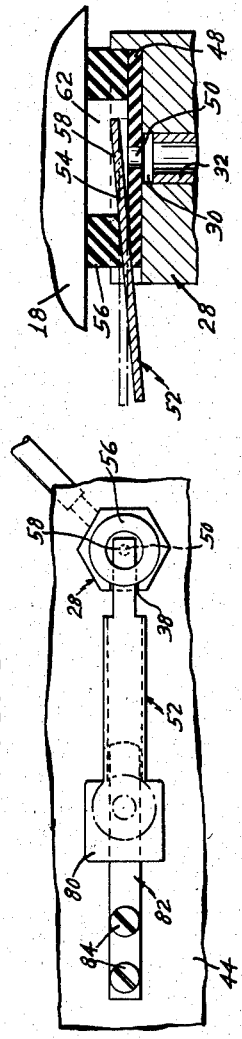
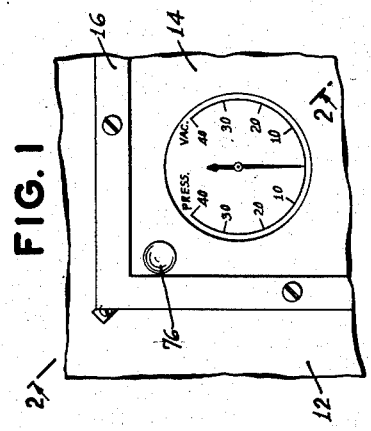

United States Patent Office 2,886,971
Patented May 19, 1959

2,886,971

PRESSURE GAGE VALVE FOR RESPIRATORS

George Gorham, New York, N.Y., assignor to Conitech, Ltd., New York, N.Y., a corporation of New York Application December 31, 1954, Serial No. 479,116

8 Claims. (Cl. 73—420)

This invention relates generally to improvements in indicating gage valves and, more particularly, to improvements in pressure indicating gage valves adapted for use in artificial respiration apparatus.

The primary aim and object of the present invention is the provision, in artificial respiration apparatus, having a pressure indicating gage for indicating pressure in a cuirass or other respiration chamber or device, of a valve arrangement for controlling the air flow to said gage so that the latter is normally out of fluid communication with the pressure source to be indicated thereon and is adapted to be manually operated to provide fluid communication with such pressure source when a pressure reading is desired whereby to greatly prolong the life of the gage and minimize the need for replacements thereof.

Another important object of the present invention is the provision of a generally improved valve arrangement of the aforenoted character which is uniquely simple in design and construction, reliable in operation, and which is eminently suitable for its intended purpose.

The above and other objects, features and advantages of the present invention will be more fully understood from the following description considered in connection with the accompanying illustrative drawings.

In the drawing which illustrates the best mode now contemplated by me for carrying out my invention:

Fig. 1 is a fragmentary top plan view of the artificial respiration apparatus formed according to the present invention;

Fig. 2 is a sectional view, on an enlarged scale, taken on the line 2—2 of Fig. 1;

Fig. 3 is a sectional view taken on the line 3—3 of Fig. 2;

Fig. 4 is a sectional view taken on the line 4—4 of Fig. 2;

Fig. 5 is an enlarged view of encircled area 5 of Fig. 2; and

Fig. 6 is a perspective view of a fitting formed according to the present invention.

The respirator pumping apparatus of the present invention is generally of the type shown and described in the co-pending application of Thomas C. Huxley III et al. for Artificial Respiration Apparatus, Ser. No. 362,316, filed June 17, 1953, now Patent No. 2,779,329, and assigned to the assignee of the present invention. Thus the respirator pumping apparatus 10 is adapted to periodically supply air to and withdraw air from a cuirass or other respiration chamber which is operatively connected to said pumping apparatus or to supply air rhythmically to a respiration device associated with such apparatus. The apparatus 10 is structurally similar to the corresponding apparatus of the aforereferred to copending application and differs therefrom in the respects to be fully described in detail hereinafter.

The apparatus 10 comprises a casing 12 having an instrument panel 14 mounted at an upper part thereof in the instrument panel frame 16, said instrument panel having a pressure indicating page 18 mounted thereto in a manner to be described in detail hereinafter. The apparatus 10, when operatively associated with a cuirass or other respiration chamber, normally alternates between partial evacuation and normal pressure of the air within the cuirass or chamber at a controlled and variable rate to successfully simulate normal respiration, said apparatus having means integrated therewith for controlling the negative pressure or suction applied to the cuirass or other chamber and for controlling the amount of positive pressure applied to said cuirass or chamber. Accordingly the pressure indicating gage 18 is adapted to indicate both positive pressure and negative pressure or suction as indicated in Fig. 1. The pressure gage 18 is provided with the usual inlet fitting 20 which projects from the bottom wall 60 of the gage casing 21 and said fitting is adapted for controlled fluid communication with the conduit means here constituted by the fitting assembly 22 and the conduit 24, the latter being in fluid communication with said fitting assembly by means of the elbow fitting 26. The conduit or pressure transmitting tube 24 is in fluid communication with the pressure source to be directly indicated on the gage 18 in the manner fully illustrated and described in the aforereferred to co-pending application.

The fitting assembly 22 comprises a fitting 28 having an aperture 30 extending therethrough, said aperture having one leg 32 of the fitting 26 secured therein in fluid sealing relation in any suitable manner, for example by means of a press fit. The other leg 34 of the elbow fitting 26 is secured to an adjacent end of the pressure transmitting tube 24 in fluid sealing relation therewith. The aperture 30 is in fluid communication with the recess 36 of the fitting 28 and the latter is provided with a slot 38 which communicates with said recess as best shown in Fig. 6. A threaded end portion 40 of fitting 28 extends through the aperture 42 provided in the mounting panel 44, said threaded portion having a clamping nut 46 threaded thereon as shown in Fig. 2 for mounting the fitting 28 to said mounting panel. Positioned in the recess 36 is a resilient member 48 which is apertured therethrough as indicated at 50, said aperture constituting a port which is at all times in fluid communication with the tube or conduit 24.

In order to control the fluid flow through the port 50 from the pressure transmitting tube 24 there is provided a longitudinally extending substantially rigid valve member 52 which has an end portion 54 resiliently mounted in operative association with said port. The end portion 54 of the valve member 52 extends through the slot 38 provided in the fitting 28 and is disposed between the resilient member 48 and the resilient member 56 which is partially disposed in the recess 36 in superposed relation with the member 48. Thus the end portion 54 of the member 52 is resiliently mounted between the resilient members 48 and 56 and said end portion includes a portion 58 which normally closes the port 50 to thereby prevent fluid flow therethrough to the pressure indicating page 18. The resilient member 56 is adapted to be clamped in position against the wall 60 of the gage 18 to thereby define a fluid chamber 62 which is sealed from the atmosphere, it being understood that the members 48, 52 and 56 are adapted to be clamped in fluid sealing relation between the fitting 28 and the gage 18.

The pressure gage 18 may be mounted relative to the instrument panel 14 in any suitable manner, there being preferably interposed between said panel and the pressure gage a suitable gasket 64. In the illustrated embodiment there are provided a plurality of peripherally disposed spacer members 66, one of which is shown in the illustrated drawing, and said spacer members extend between the flange 68 of the gage 18 and the mounting panel 44, said spacer members being mounted to said mounting panel by means of screws 70. The aforedescribed manner of mounting the pressure gage between the instrument panel 14 and the mounting panel 44 provides a clamping engagement between the fitting assembly 22 and the wall 60 of the gage 18 whereby to seal the chamber 62 from the atmosphere, it being noted that the pressure gage fitting 20 extends into said chamber. The valve member 52 is normally in a closed position, as shown in solid lines in Fig. 2, in which fluid flow through the port 50 is blocked and said valve member is adapted to be angularly displaced to the broken line position shown in said figure to provide fluid flow through said port and therefore to provide a direct pressure reading at the gage 18 of the pressure at the pressure source associated with the pressure transmitting tube 24. In order to provide for this angular displacement of the valve member 52 to provide a pressure reading at the gage 18, there is provided a manually depressible plunger 72 which is mounted to the instrument panel 14 through the intermediation of the bearing member 74. The plunger 72 terminates in a knob 76 which is positioned in close proximity to gage 18 and it will be understood that said plunger is axially movable in the bearing 74 which is fixed to the instrument panel 14 in any desired manner. The plunger 72 is provided with a stop ring 78 in order to prevent the complete withdrawal of said plunger from the instrument panel. The plunger 72 is mounted for operative association with the end portion 80 of the valve member 52 and when it is desired to obtain a pressure reading it is merely necessary to depress the knob 76 of the plunger 72 and said depression will be effective to cock or angularly displace the end portion 54 of said valve member so as to uncover port 50 and provide fluid flow between the pressure transmitting tube 24 and the interior of the pressure indicating gage 18. In order to bias the plunger 72 and the valve member 52 to the normally closed position in which fluid flow through the port 50 is blocked, there is provided a spring member 82 which is mounted to the panel 44 by means of the screws 84. The spring 82 thus biases the valve member 52 and the plunger 72 to their normal valve closed positions and it will be apparent that the plunger 72 is adapted to be manually depressed against the bias of said spring and on the release of such plunger the valve member will return to its normally closed position. The end portion 86 of the spring 82 is disposed between the pair of depending flanges 88 of the valve member 52, said depending flanges serving to rigidify the valve member and to provide positive guide means therefor with respect to the spring member 82. From the above it will be apparent that the valve member 52 is normally positioned in the valve closed position as shown in solid lines in Fig. 2 and is movable by means of the plunger 72 to the solid line position shown in Fig. 5 in which said valve member is angularly displaced to sufficiently compress the portions to uncover the port 50 to provide fluid communication therethrough to the pressure indicating gage.

It will be apparent that the above described valve arrangement controls the fluid flow to the pressure indicating gage whereby the latter is normally out of fluid communication with the pressure source to be indicated thereon and is adapted to be manually operated by depressing the plunger 72 in the manner aforedescribed to provide fluid communication with such pressure source when a pressure reading is desired so as to greatly prolong the life of the gage and minimize the need for replacements thereof. It will be noted that the members 48 and 56 constitute resilient gasket means which is held under partial compression by the gage 18 when the latter is clamped in position by the screws 70, and that portions of said resilient gasket means are disposed on opposite sides of the valve so that when the latter is moved to the open position illustrated in Fig. 5 against the resiliency of the underlying portion of member 48, the overlying portion of member 56 continues to remain in fluid-sealing relation with valve 52 so as to maintain the chamber 62 sealed from the atmosphere externally of said gasket means.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent is:

1. Means for communicating a source of air with a gage for indicating the air pressure of said source, said means comprising a fluid conduit for communicating said pressure to said gage, said conduit having an outlet fitting provided with resilient gasket means interposed between said gage and the said conduit, said gasket means being apertured centrally thereof for providing a passage between said gage and said conduit, means for releasably holding said gage in fluid sealing relation with said gasket means and for partially compressing said gasket means, a normally closed valve interposed between said outlet fitting and said gage for interrupting the fluid communication through said passage, said gasket means resiliently holding said valve in its said normally closed condition, and means for moving said valve against the resiliency of said gasket means to open the valve for placing said gage in fluid pressure communication with said conduit.

2. Means for communicating a source of air subject to cyclically varying pressure with a gage for indicating said cyclically varying pressure, said means comprising a fluid conduit for communicating said pressure to said gage, said conduit having an outlet fitting provided with resilient gasket means interposed between said gage and the said conduit, said gasket means being apertured centrally thereof for providing a passage between said gage and said conduit, means for releasably holding said gage in fluid sealing relation with said gasket means and for partially compressing said gasket means, a normally closed valve interposed between said outlet fitting and said gage for interrupting the fluid communication through said passage, said gasket means resiliently holding said valve in its said normally closed condition, and a part fixed to said valve and projecting outwardly of said gasket means for operation to move said valve against the resiliency of said gasket means to open the valve for placing said gage in fluid pressure communication with said conduit, said gasket means serving to provide a fluid seal for said part to prevent escape of fluid pressure from said fitting when the valve is opened.

3. Means for communicating a source of air subject to cyclically varying pressure with a gage for indicating said cyclically varying pressure, said means comprising a fluid conduit for communicating said pressure to said gage, said conduit having an outlet fitting provided with resilient gasket means interposed between said gage and the said conduit, said gasket means being apertured centrally thereof for providing a passage between said gage and said conduit, means for releasably holding said gage in fluid sealing relation with said gasket means and for partially compressing said gasket means, a normally closed valve interposed between said outlet fitting and said gage for interrupting the fluid communication through said passage, said gasket means having portions disposed at opposite sides, respectively, of said valve and resiliently holding said valve in its said normally closed condition, and a part fixed to said valve and projecting outwardly of said gasket means between said portions thereof for operation to move said valve against the resiliency of one of said portions of the gasket while the other portion of said gasket means remains in fluid sealing relation with said valve part to prevent escape of fluid pressure from said fitting when the valve is opened.

4. Means for communicating a source of air subject to cyclically varying pressure with a gage for indicating said cyclically varying pressure, said means comprising a fluid conduit for communicating said pressure to said gage, said conduit having an outlet fitting provided with resilient gasket means interposed between said gage and the said conduit, said gasket means being apertured centrally thereof for providing a passage between said gage and said conduit, means for releasably holding said gage in fluid sealing relation with said gasket means and for partially compressing said gasket means, a normally closed valve interposed between said outlet fitting and said gage for interrupting the fluid communication through said passage, said gasket means resiliently holding said valve in its said normally closed condition, and means for moving said valve against the resiliency of said gasket means to open the valve for placing said gage in fluid pressure communication with said conduit, said outlet fitting having a peripheral wall portion for removably holding said gasket means in position.

5. Means for communicating a source of air subject to cyclically varying pressure with a gage for indicating said cyclically varying pressure, said means comprising a fluid conduit for communicating said pressure to said gage, said conduit having an outlet fitting provided with resilient gasket means interposed between said gage and the said conduit, said gasket means being apertured centrally thereof for providing a passage between said gage and said conduit, means for releasably holding said gage in fluid sealing relation with said gasket means and for partially compressing said gasket means, a normally closed valve interposed between said outlet fitting and said gage for interrupting the fluid communication through said passage, said gasket means resiliently holding said valve in its said normally closed condition, and means for moving said valve against the resiliency of said gasket means to open the valve for placing said gage in fluid pressure communication with said conduit, said outlet fitting having a peripheral wall portion for removably holding said gasket means in position, said valve having a part projecting outwardly of said peripheral wall portion for operation to move the valve to its open position.

6. In artificial respiration apparatus, a fluid conduit subjected to cyclically varying air pressure therein, said conduit having an outlet fitting provided with resilient gasket means interposed between said conduit and an overlying wall surface, the latter being in fluid sealing relation with said gasket means and partially compressing the same, said gasket means being apertured for providing an air passage therethrough a normally closed valve disposed in relation to said outlet fitting for interrupting fluid flow through said passage, said gasket means resiliently holding said valve in said normally closed condition, and means for moving said valve against the resiliency of said gasket means to open the valve for providing a fluid flow through said outlet fitting.

7. In artificial respiration appartaus, a fluid conduit subjected to cyclically varying air pressure therein, said conduit having an outlet fitting provided with resilient gasket means interposed between said conduit and an overlying wall surface, the latter being in fluid sealing relation with said gasket means and partially compressing the same, said gasket means being apertured for providing an air passage therethrough a normally closed valve disposed in relation to said outlet fitting for interrupting fluid flow through said passage, said gasket means resiliently holding said valve in said normally closed condition, and a part fixed to said valve and projecting outwardly of said gasket means for operation to move said valve against the resiliency of said gasket means to open the valve for providing fluid flow through said outlet fitting, said gasket means serving to provide a fluid seal for said part to prevent escape of fluid pressure from said fitting when the valve is opened.

8. In artificial respiration apparatus, a fluid conduit subjected to cyclically varying air pressure therein, an outlet port for said conduit, resilient gasket means partially compressed in position overlying said conduit, said gasket means being apertured for providing an air passage therethrough an elongated normally closed valve member having one end portion thereof disposed in relation to said port to control the fluid flow through said passage, said gasket means resiliently holding said valve member in said normally closed condition, said valve member projecting outwardly of said gasket means with the opposite end portion thereof being operable to move said one end portion against the resiliency of said gasket means to open said valve member for providing fluid flow through said outlet port.

References Cited in the file of this patent

UNITED STATES PATENTS

| | | |
|---|---|---|
| 338,711 | Burton | Mar. 30, 1886 |
| 957,347 | Kennedy | May 10, 1910 |
| 1,015,980 | Robbins | Jan. 30, 1912 |
| 1,031,109 | Euston | July 12, 1912 |
| 1,879,205 | Gunn | Sept. 27, 1932 |
| 2,162,242 | Branower | June 13, 1939 |
| 2,408,976 | Forbragd | Oct. 8, 1946 |
| 2,422,796 | Monroe et al. | June 24, 1947 |

FOREIGN PATENTS

| | | |
|---|---|---|
| 120,393 | Sweden | Dec. 9, 1947 |